US011448786B2

(12) United States Patent
Lee et al.

(10) Patent No.: US 11,448,786 B2
(45) Date of Patent: Sep. 20, 2022

(54) ANISOTROPIC MEDIA FOR FULL TRANSMISSION OF OBLIQUELY INCIDENT ELASTIC WAVES

(71) Applicants: Seoul National University R&DB Foundation, Seoul (KR); CENTER FOR ADVANCED META-MATERIALS, Daejeon (KR)

(72) Inventors: Jeseung Lee, Anyang-si (KR); Minwoo Kweun, Seoul (KR); Yoon Young Kim, Seoul (KR)

(73) Assignees: SEOUL NATIONAL UNIVERSITY R&DB FOUNDATION, Seoul (KR); CENTER FOR ADVANCED META-MATERIALS, Daejeon (KR)

( * ) Notice: Subject to any disclaimer, the term of this patent is extended or adjusted under 35 U.S.C. 154(b) by 394 days.

(21) Appl. No.: 16/860,405

(22) Filed: Apr. 28, 2020

(65) Prior Publication Data
US 2020/0348431 A1 Nov. 5, 2020

(30) Foreign Application Priority Data

May 3, 2019 (KR) .......................... 10-2019-0052563
Feb. 6, 2020 (KR) .......................... 10-2020-0014525

(51) Int. Cl.
*G01V 1/30* (2006.01)
*G01V 1/28* (2006.01)

(52) U.S. Cl.
CPC ................ *G01V 1/30* (2013.01); *G01V 1/284* (2013.01); *G01V 2210/675* (2013.01)

(58) Field of Classification Search
CPC .... G01V 1/30; G01V 1/284; G01V 2210/675; G10K 11/20
See application file for complete search history.

(56) References Cited

U.S. PATENT DOCUMENTS

| 11,205,410 | B2* | 12/2021 | Kim | ..................... G10K 11/172 |
| 2018/0374466 | A1* | 12/2018 | Kim | ..................... G10K 11/162 |
| 2020/0348431 | A1* | 11/2020 | Lee | ........................ G10K 11/20 |

FOREIGN PATENT DOCUMENTS

| JP | 2017-170713 | 9/2017 |
| KR | 10-1626093 | 5/2016 |

(Continued)

*Primary Examiner* — Daniel Pihulic
(74) *Attorney, Agent, or Firm* — Lex IP Meister, PLLC

(57) ABSTRACT

An exemplary embodiment of the present invention provides an anisotropic medium for full transmission of obliquely incident elastic waves considering a longitudinal wave and a shear wave by using an anisotropic medium designed to fully transmit elastic waves in a desired mode when elastic waves are obliquely incident to a boundary of different media. The anisotropic medium for fully transmitting an obliquely incident elastic wave according to an exemplary embodiment of the present invention includes: an incident medium to which an incident elastic wave including a longitudinal wave and a shear wave, and being obliquely incident with a predetermined incidence angle, is incident and reflected; a transmission medium to which a transmitting elastic wave including a longitudinal wave and a shear wave is transmitted; and an anisotropic medium, installed between the incident medium and the transmission medium, for blocking reflection of a predetermined reflecting elastic wave as a predetermined full transmission condition is satisfied, and fully transmitting a transmitting elastic wave in a predetermined type of full transmission, wherein the full transmission condition includes a phase matching condition based on a wavenumber relationship of an eigenmode in the anisotropic medium, and a polarization matching condition based on a relationship between a polarization vector and an amplitude of the eigenmode.

10 Claims, 13 Drawing Sheets

(56) References Cited

FOREIGN PATENT DOCUMENTS

| KR | 10-2018-0002338 | 1/2018 |
| KR | 10-1807553 | 1/2018 |
| KR | 10-1856201 | 5/2018 |

* cited by examiner

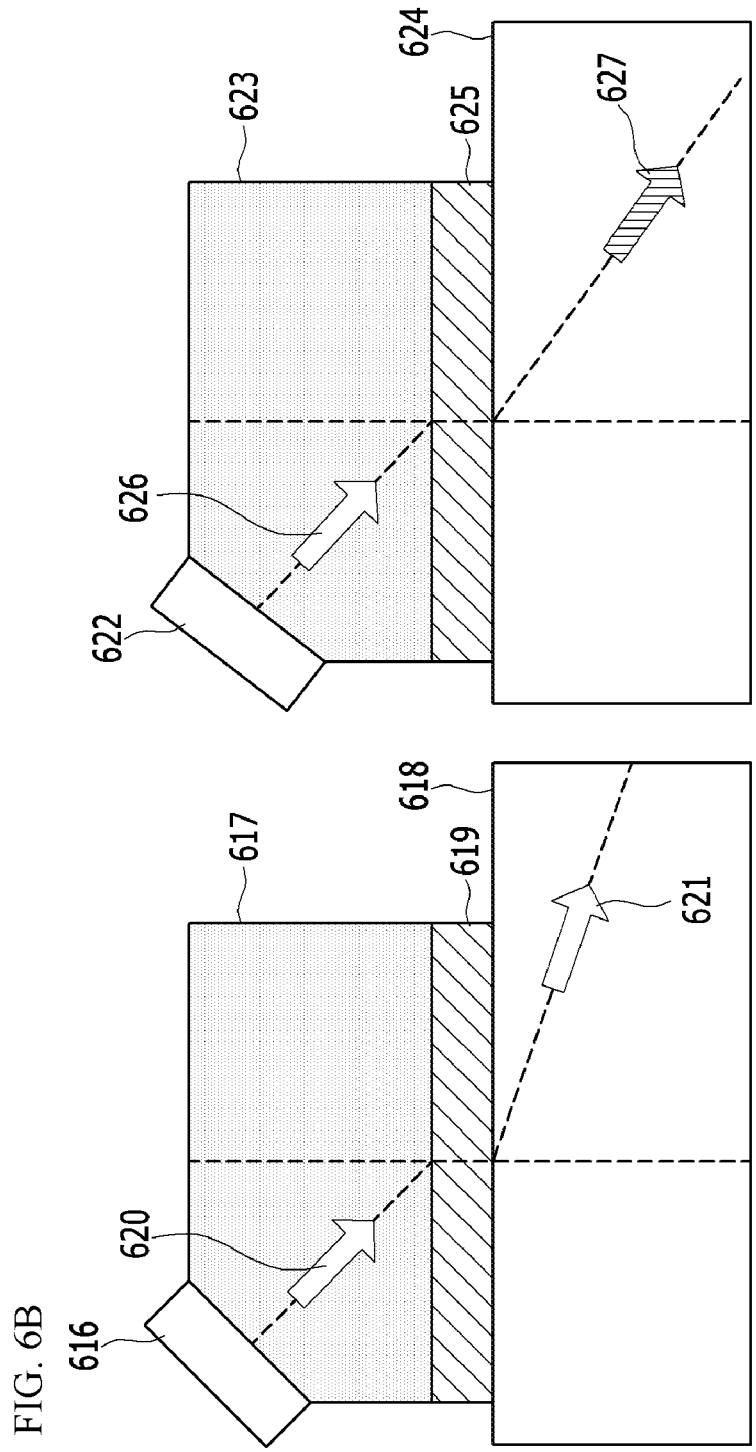

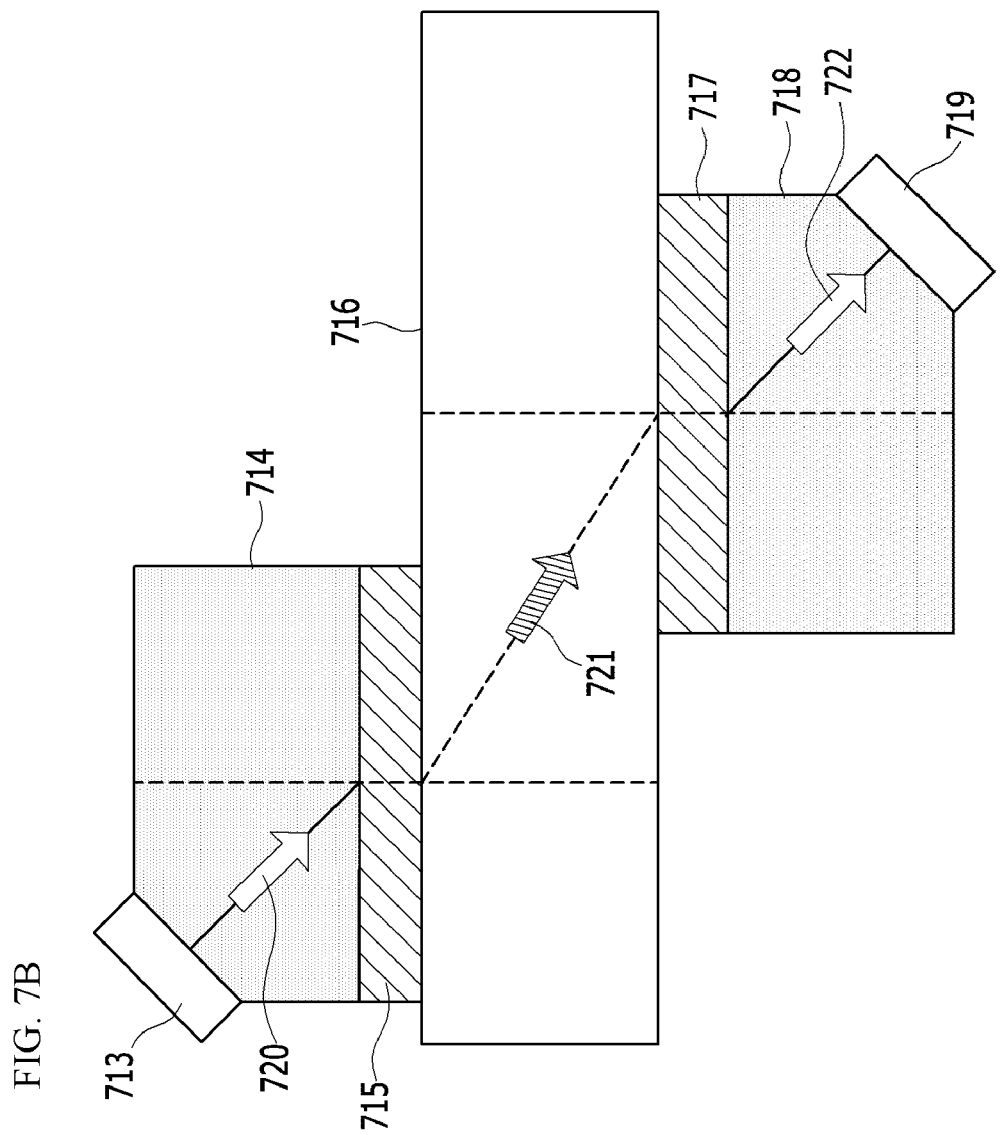

ANISOTROPIC MEDIA FOR FULL TRANSMISSION OF OBLIQUELY INCIDENT ELASTIC WAVES

CROSS-REFERENCE TO RELATED APPLICATION

This application claims priority to and the benefit of Korean Patent Application No. 10-2019-0052563 filed in the Korean Intellectual Property Office on May 3, 2019, and Korean Patent Application No. 10-2020-0014525 filed in the Korean Intellectual Property Office on Feb. 6, 2020, the entire contents of which are incorporated herein by reference.

BACKGROUND OF THE INVENTION

An anisotropic medium for full transmission of obliquely incident elastic waves is provided.

Full transmission of waves signifies a phenomenon in which a wave transmits from one medium to another medium with 100% energy efficiency. In general, when a wave is incident to a boundary of different media, some waves are partially reflected, and some other waves are partially transmitted. However, full transmission of waves to a target system is a matter of major concern in the industries. In the above-noted situation, skills for maximizing transmittance of waves have been continuously researched.

Conventional full transmission technology includes a Fabry-Perot resonance phenomenon and an impedance matching skill. When a single-layered medium is inserted into a boundary of same media, and a thickness of the layer becomes integer multiples of half the incident wave wavelength, then the wave fully transmits the layer, which is referred to as a Fabry-Perot resonance phenomenon. When a single-layered medium is inserted into the boundary of different media, the thickness of the layer becomes integer multiples of ¼ the incident wave wavelength, and the impedance of the layer is a geometric mean of impedance of two media, then the wave fully transmits the layer, which is referred to as impedance matching.

The greatest limit of the conventional full transmission technology is that it is only applicable to the single-mode case such as an electromagnetic wave (there is only a transverse wave) or a sound wave (there is only a longitudinal wave). However, the elastic wave includes both of a longitudinal wave and a shear wave, so it is multi-mode case and the conventional full transmission technology may not be applied. Another limit of the conventional method for full transmission is that it is limited to a normal incidence. In general, when the elastic waves are obliquely incident upon the boundary of different media, the longitudinal wave and the shear wave are reflected, or the longitudinal wave and the shear wave are transmitted. In the above-noted situation, the elastic waves in a desired mode may not be fully transmitted to a targeted system according to prior art.

However, obliquely incident elastic waves are used in nondestructive testing for a structural health monitoring, defect inspection, a wedge-based pipe test, a wedge-based non-invasive flowmeter, a medical ultrasonic treatment skill, a medical ultrasonic imaging skill, and an ultrasonic transducers. So, a skill for overcoming low transmittance of obliquely incident elastic waves which is the conventional technical limit is required.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide an anisotropic medium for full transmission of obliquely incident elastic waves considering a longitudinal wave and a shear wave by using an anisotropic medium designed to fully transmit elastic waves in a desired mode when elastic waves are obliquely incident to a boundary of different media.

An exemplary embodiment of the present invention provides an anisotropic medium for fully transmitting an obliquely incident elastic wave, including: an incident medium to which an incident elastic wave including a longitudinal wave and a shear wave, and being obliquely incident with a predetermined incidence angle, is incident and reflected; a transmission medium to which a transmitting elastic wave including a longitudinal wave and a shear wave is transmitted; and an anisotropic medium, installed between the incident medium and the transmission medium, for blocking reflection of a predetermined reflecting elastic wave as a predetermined full transmission condition is satisfied, and fully transmitting a transmitting elastic wave in a predetermined type of full transmission, wherein the full transmission condition includes a phase matching condition based on a wavenumber relationship of an eigenmode in the anisotropic medium, and a polarization matching condition based on a relationship between a polarization vector and an amplitude of the eigenmode.

The phase matching condition may satisfy Equation 1:

$$(k_1-k_2) \times d = l\pi$$

$$(k_1-k_3) \times d = m\pi$$

$$(k_1-k_4) \times d = n\pi \quad \text{[Equation 1]}$$

($k_i$: a wave number of the eigenmode i (i=1, 2, 3, and 4), d: a thickness of the anisotropic medium, and l, m, and n: integers).

The polarization matching condition may satisfy Equation 2:

Equation 2

In the case of longitudinal wave→longitudinal wave full transmission, $$\begin{Bmatrix} \cos\theta_L^{inc} \\ \sin\theta_L^{inc} \end{Bmatrix} = \sum_{i=1}^{4} A_i \vec{P}_i, \quad \tan\theta_L^{tra} = \frac{\sum_{i=1}^{4} A_i \cos(k_i d) P_y^i}{\sum_{i=1}^{4} A_i \cos(k_i d) P_x^i}$$

In the case of shear wave→shear wave full transmission, $$\begin{Bmatrix} \cos\theta_L^{inc} \\ \sin\theta_L^{inc} \end{Bmatrix} = \sum_{i=1}^{4} A_i \vec{P}_i, \quad \tan\theta_L^{tra} = \frac{\sum_{i=1}^{4} A_i \cos(k_i d) P_y^i}{\sum_{i=1}^{4} A_i \cos(k_i d) P_x^i}$$

In the case of longitudinal wave→shear wave full transmission, $$\left\{ \begin{array}{c} \cos\theta_L^{inc} \\ \sin\theta_L^{inc} \end{array} \right\} = \sum_{i=1}^{4} A_i \vec{P}_i, \tan\theta_L^{tra} = \frac{\sum_{i=1}^{4} A_i \cos(k_i d) P_y^i}{\sum_{i=1}^{4} A_i \cos(k_i d) P_x^i}$$

In the case of shear wave→longitudinal wave full transmission, $$\left\{ \begin{array}{c} -\sin\theta_S^{inc} \\ \cos\theta_S^{inc} \end{array} \right\} = \sum_{i=1}^{4} A_i \vec{P}_i, -\cot\theta_S^{tra} = \frac{\sum_{i=1}^{4} A_i \cos(k_i d) P_y^i}{\sum_{i=1}^{4} A_i \cos(k_i d) P_x^i}$$

($\theta_L^{inc}$: an incidence angle of an incident longitudinal wave, $\theta_S^{inc}$: an incidence angle of an incident shear wave, $\theta_L^{tra}$: a refraction angle of a transmitting longitudinal wave, $\theta_S^{tra}$: a refraction angle of a transmitting shear wave, $k_i$: a wavenumber of an eigenmode i, $\vec{P}_i=(P_x^i, P_y^i)$: a polarization vector of an eigenmode i, and $A_i$: and a displacement amplitude of an eigenmode i (i=1, 2, 3, and 4)).

The incident medium and the transmission medium may include different media.

The anisotropic medium may mutually contact a boundary surface of the incident medium and a boundary surface of the transmission medium between the incident medium and the transmission medium as a surface contact, respectively.

The type of full transmission may include a mode-preserving full transmission in which the incident elastic wave and the transmitting elastic wave have an identical mode, and a mode-converting full transmission in which modes of the incident elastic wave and the transmitting elastic wave are converted.

The anisotropic medium may include an elastic metamaterial including a predetermined slit structure. Regarding the elastic metamaterial, a slit structure of a unit cell may be periodically arranged from top to bottom and from right to left. Here, the slit structure may have a slit shape including a rectangle and two semicircles. The slit structure may include predetermined design variables, and the design variables include: a length ($l_1$), a radius ($r_1$), and a rotation angle ($\theta_1$) of the first slit positioned in a center of a unit cell; a length ($l_2$), a radius ($r_2$), and a rotation angle ($\theta_2$) of the second slit positioned on a vertex of the unit cell; a size (a) of the unit cell; and a number ($N_{cell}$) of the unit cells.

The elastic wave that is obliquely incident from the incident medium to the transmission medium may be fully transmitted through the anisotropic medium for full transmission of obliquely incident elastic waves, in a mode-preserving full transmission (longitudinal wave->longitudinal wave, or shear wave->shear wave) or a mode-converting full transmission (longitudinal wave->shear wave, or shear wave->longitudinal wave).

Further, industrially way, an effect of improving transmittance of the elastic ultrasonic wave used for nondestructive testing for a structural health monitoring, defect inspection, a wedge-based pipe test, a wedge-based non-invasive flowmeter, a medical ultrasonic treatment skill, a medical ultrasonic imaging skill, and an ultrasonic transducer is provided.

BRIEF DESCRIPTION OF THE DRAWINGS

FIG. 6B shows an operational principle of a transducer according to an exemplary embodiment of the present invention.

FIG. 7B shows an operational principle of a metawedge-based pipe test according to an exemplary embodiment of the present invention.

DETAILED DESCRIPTION OF THE EMBODIMENTS

Terminologies used herein are to describe only a specific exemplary embodiment, and are not to limit the present invention. Singular forms used herein include plural forms as long as phrases do not clearly indicate an opposite meaning. A term "including" used in the present specification concretely indicates specific properties, regions, integer numbers, steps, operations, elements, and/or components, and is not used to exclude the presence or addition of other specific properties, regions, integer numbers, steps, operations, elements, components, and/or a group thereof.

All terms including technical terms and scientific terms used herein have the same meaning as that generally understood by those skilled in the art to which the present invention pertains unless defined otherwise. Terms defined in a generally used dictionary are additionally interpreted as having meanings matched to related art documents and the currently disclosed contents, and are not to be interpreted as having idealized or formal meaning unless so defined.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

When elastic waves are obliquely incident to a boundary of different media, some waves (longitudinal waves and shear waves) are reflected, and some other waves (longitudinal waves and shear waves) are transmitted. A conceptual diagram thereon is shown in FIG. 1.

Figure 1:
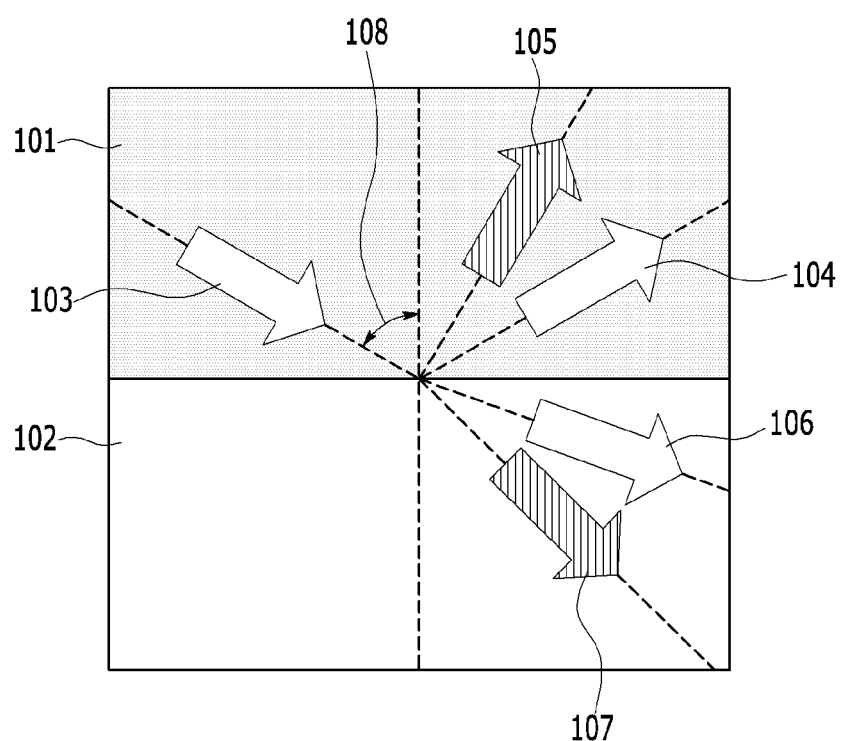
FIG. 1 shows a situation in which an incident elastic wave is obliquely incident from an incident medium to a transmission medium.

FIG. 1 shows a situation in which an incident elastic wave 103 is obliquely incident from an incident medium 101 to a transmission medium 102. Here, the incident elastic wave 103 may be assumed to be a longitudinal wave without losing generality. The same logic may be applied to the shear wave of the incident elastic wave 103. In the general case, a reflected longitudinal wave 104, a reflected shear wave 105, a transmitted longitudinal wave 106, and a transmitted shear wave 107 exist. A reflection angle and intensity of the reflected wave, and a refraction angle and intensity of the transmitted wave, are determined by properties of an incident medium and a reflected medium, and an incidence angle 108 of the incident elastic wave.

When the elastic wave is incident to the boundary of different media, the undesired reflecting elastic wave may be removed and the elastic wave in a desired mode may be fully transmitted by inserting the anisotropic medium for fully transmitting the obliquely incident elastic wave into the boundary of different media. Accordingly, the full transmission of the obliquely incident elastic wave may be realized. A conceptual diagram thereon is shown in FIG. 2.

Figure 2:
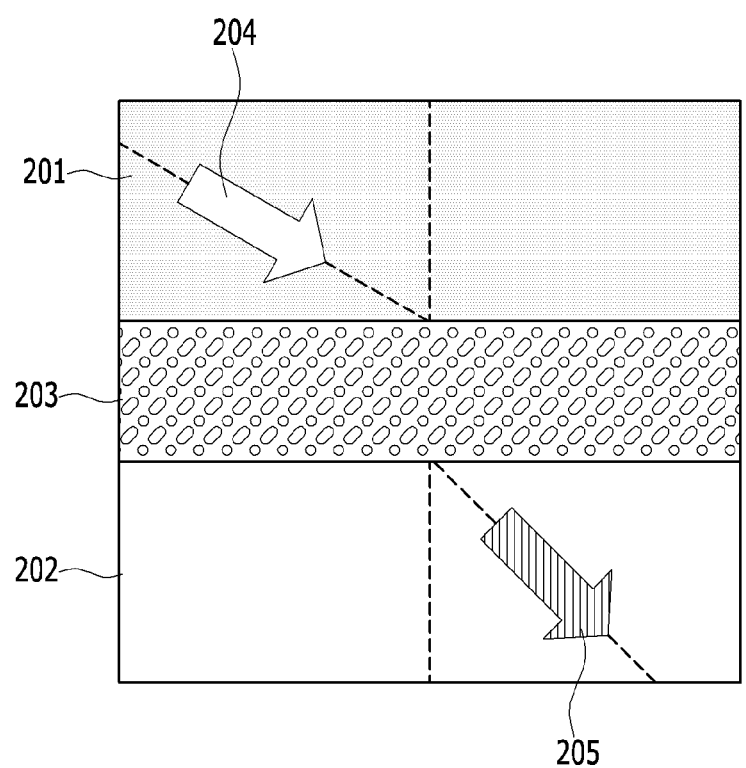
FIG. 2 shows a situation in which a designed anisotropic medium is inserted into a boundary of an incident medium and a transmission medium, and an incident elastic wave is fully transmitted as a transmitting elastic wave in a desired mode.

FIG. 2 shows a situation in which an anisotropic medium 203 is inserted between an incident medium 201 and a transmission medium 202, and an incident elastic wave 204 is fully transmitted to a transmitting elastic wave 205. Differing from reflection and transmission of elastic waves according to prior art, there is no undesired reflecting elastic waves, and the elastic waves in a desired mode are fully transmitted. The incident elastic wave 204 may be a longitudinal wave or a shear wave, and the transmitting elastic wave 205 may also be a longitudinal wave or a shear wave, thereby allowing a total of four types of full transmissions (longitudinal wave->longitudinal wave, shear wave->shear wave, longitudinal wave->shear wave, and shear wave->longitudinal wave), which may be realized through different anisotropic media 203. The type in which the incident elastic wave 204 and the transmitting elastic waves 205 have a same mode is a mode-preserving full transmission (longitudinal wave->longitudinal wave, and shear wave->shear wave). The type in which the incident elastic wave 204 and the transmitting elastic waves 205 have different modes is a mode-converting full transmission (longitudinal wave->shear wave, and shear wave->longitudinal wave).

There is a mathematical equation condition that must be satisfied by the anisotropic medium 203 so as to fully transmit the obliquely incident elastic wave 204 as a transmitting elastic wave 205 in a desired mode to a design system. In the given design system, a frequency, an incidence angle, a mode of an incident elastic wave, a mode of a transmitting elastic wave, a property of an incident medium, a property of a transmission medium, a thickness of an anisotropic medium, etc., are determined. There are two mathematical equation conditions on the anisotropic medium 203. One is a phase matching condition, and the other is a polarization matching condition.

The longitudinal wave and the shear wave are combined to each other and are propagates in the anisotropic medium 203, and there are a total of four eigenmodes. Wavenumbers of the respective eigenmodes will be set to be $k_1$, $k_2$, $k_3$, and $k_4$, polarization vectors will be set to be $\vec{P}_1$, $\vec{P}_2$, $\vec{P}_3$, $\vec{P}_4$, and displacement amplitudes will be set to be $A_1$, $A_2$, $A_3$, and $A_4$. A phase matching condition represents a relationship between the wavenumber of the eigenmodes. A phase difference between the eigenmodes of an incident boundary surface and a transmitting boundary surface must always be integer multiples of $\pi$. When a thickness of the anisotropic medium is d, the phase matching condition may be expressed as in Equation 1:

$$(k_1-k_2) \times d = l\pi$$

$$(k_1-k_3) \times d = m\pi$$

$$(k_1-k_4) \times d = n\pi \quad \text{[Equation 1]}$$

($k_i$: a wave number of the eigenmode i (i=1, 2, 3, and 4), d: a thickness of the anisotropic medium, and l, m, and n: integers).

The polarization matching condition indicates a relationship between a polarization vector and an amplitude of the eigenmode. A sum of displacement vectors of the eigenmodes on the incident boundary surface must be equivalent to the displacement vector of the incident elastic wave 204. When this condition is satisfied, no reflected elastic wave exists. A sum of displacement vectors of the eigenmodes on the transmitting boundary surface must be parallel to the displacement vector of the transmitting elastic waves 205 of a desired mode. When this condition is satisfied, the transmitting elastic wave 205 in a desired mode (longitudinal wave or shear wave) is transmitted. To sum up, when the anisotropic medium 203 satisfies the polarization matching condition, the elastic wave in a desired mode may be fully transmitted without a reflected elastic wave. The polarization matching condition is expressed in Equation 2.

[Equation 2]

The case of longitudinal wave→longitudinal wave full transmission, $$\left\{ \begin{array}{c} \cos\theta_L^{inc} \\ \sin\theta_L^{inc} \end{array} \right\} = \sum_{i=1}^{4} A_i \vec{P}_i, \quad \tan\theta_L^{tra} = \frac{\sum_{i=1}^{4} A_i \cos(k_i d) P_y^i}{\sum_{i=1}^{4} A_i \cos(k_i d) P_x^i}.$$

The case of shear wave→shear wave full transmission, $$\left\{ \begin{array}{c} \cos\theta_L^{inc} \\ \sin\theta_L^{inc} \end{array} \right\} = \sum_{i=1}^{4} A_i \vec{P}_i, \quad \tan\theta_L^{tra} = \frac{\sum_{i=1}^{4} A_i \cos(k_i d) P_y^i}{\sum_{i=1}^{4} A_i \cos(k_i d) P_x^i}.$$

The case of longitudinal wave→shear wave full transmission, $$\left\{\begin{array}{c}\cos\theta_L^{inc}\\ \sin\theta_L^{inc}\end{array}\right\} = \sum_{i=1}^{4} A_i \vec{P}_i, \tan\theta_L^{tra} = \frac{\sum_{i=1}^{4} A_i \cos(k_i d) P_y^i}{\sum_{i=1}^{4} A_i \cos(k_i d) P_x^i}$$

The case of shear wave→longitudinal wave full transmission, $$\left\{\begin{array}{c}-\sin\theta_S^{inc}\\ \cos\theta_S^{inc}\end{array}\right\} = \sum_{i=1}^{4} A_i \vec{P}_i, -\cot\theta_S^{tra} = \frac{\sum_{i=1}^{4} A_i \cos(k_i d) P_y^i}{\sum_{i=1}^{4} A_i \cos(k_i d) P_x^i}.$$

($\theta_L^{inc}$: an incidence angle of an incident longitudinal wave, $\theta_S^{inc}$: an incidence angle of an incident shear wave, $\theta_L^{tra}$: a refraction angle of a transmitting longitudinal wave, $\theta_S^{tra}$: a refraction angle of a transmitting shear wave, $k_i$: a wavenumber of an eigenmode i, $\vec{P}_i = (P_x^i, P_y^i)$: a polarization vector of an eigenmode i, and $A_i$: a displacement amplitude of an eigenmode i (i=1, 2, 3, 4))

Equation 1 includes three independent equations and Equation 2 includes another three independent equations, so there are six independent equations to be satisfied by the anisotropic medium. Equation 1 and Equation 2 may be expressed as a property of an anisotropic medium 203 when a frequency, an incidence angle, a mode of an incident elastic wave 204, a mode of a transmitting elastic wave 205, a property of an incident medium 201, a property of a transmission medium 202, and a thickness of an anisotropic medium 203 are given. The property of the anisotropic medium 203 includes a mass density (p) and six elastic coefficients $C_{11}$, $C_{22}$, $C_{66}$, $C_{12}$, $C_{16}$, and $C_{26}$, so it has a total of seven design variables. That is, the number (7) of the design variables is greater than the number (6) of Equations to be satisfied, so full transmission of the obliquely incident elastic wave may be realized all the time by appropriately designing the anisotropic medium 203 for a desired design system. The anisotropic medium for fully transmitting an obliquely incident elastic wave according to an exemplary embodiment of the present invention may include a material that exists in nature, a chemically synthesized material, a composite material, and an elastic metamaterial including a slit structure. A realization of an anisotropic medium using an elastic metamaterial will be presented in a detailed exemplary embodiment.

The anisotropic medium for fully transmitting an obliquely incident elastic wave according to an exemplary embodiment of the present invention may realize the full transmission of an obliquely incident elastic wave which is impossible with a conventional skill. For example, the transmittance of the transmitting elastic wave in a desired mode may be maximized by using the anisotropic medium for full transmission of obliquely incident elastic waves. In theory, the transmittance may reach up to 100%. However, when the elastic wave is obliquely transmitted on the boundary of different media by using conventional art, a reflecting elastic wave necessarily exists, and intensity of the transmitting elastic wave is accordingly less.

By using the exemplary embodiment of the present invention, the transmitting elastic wave may be purely transmitted in a desired mode by making intensity of the transmitting elastic wave not in a desired mode as 0. However, there is no method for obliquely transmitting the incident elastic wave as a pure longitudinal wave according to conventional art. This is because the shear wave is necessarily transmitted altogether. The conventional art for transmitting the incident elastic wave as a pure shear wave includes a method for using a Snell's critical angle. However, this method has a drawback of having low energy efficiency (which is less than 30% on the boundary of plastic and a metal material) because of existence of the reflecting elastic wave. Further, there is a limit that it is only applicable to the incident elastic wave having an incidence angle that is equal to or greater than a critical angle. As described, the phenomenon for fully transmitting an obliquely incident elastic wave which was not realized according to the conventional art may be realized by using the exemplary embodiment of the present invention.

In the exemplary embodiment of the present invention, a principle of a method for realizing full transmission of an obliquely incident elastic wave is not based on resonance but is a method for using an anisotropy of the medium, and hence, transmittance may not sensitively react to changes of frequency and incidence angle. However, according to conventional art, the case of using Fabry-Perot resonance may steeply reduce transmittance according to the changes of frequency and incidence angle, and the case of using impedance matching may steeply reduce transmittance according to the change of incidence angle.

A material that exists in nature, a chemically synthesized material, and a composite material may be used to the anisotropic medium for fully transmitting an obliquely incident elastic wave according to an exemplary embodiment of the present invention, but there may be a difficulty in finding or synthesizing the material that has a desired property. A method for realizing an anisotropic medium by using an elastic metamaterial including a slit structure for freely designing an extreme property of a material will now be described.

The elastic metamaterial to be applied to an exemplary embodiment of the present invention has a configuration in which a slit structure in a unit cell is periodically arranged in top to bottom and right to left directions. Various patterns are usable to the slit structure in the unit cell. The anisotropic medium for fully transmitting an obliquely incident elastic wave according to an exemplary embodiment of the present invention may include a slit structure.

Figure 3:
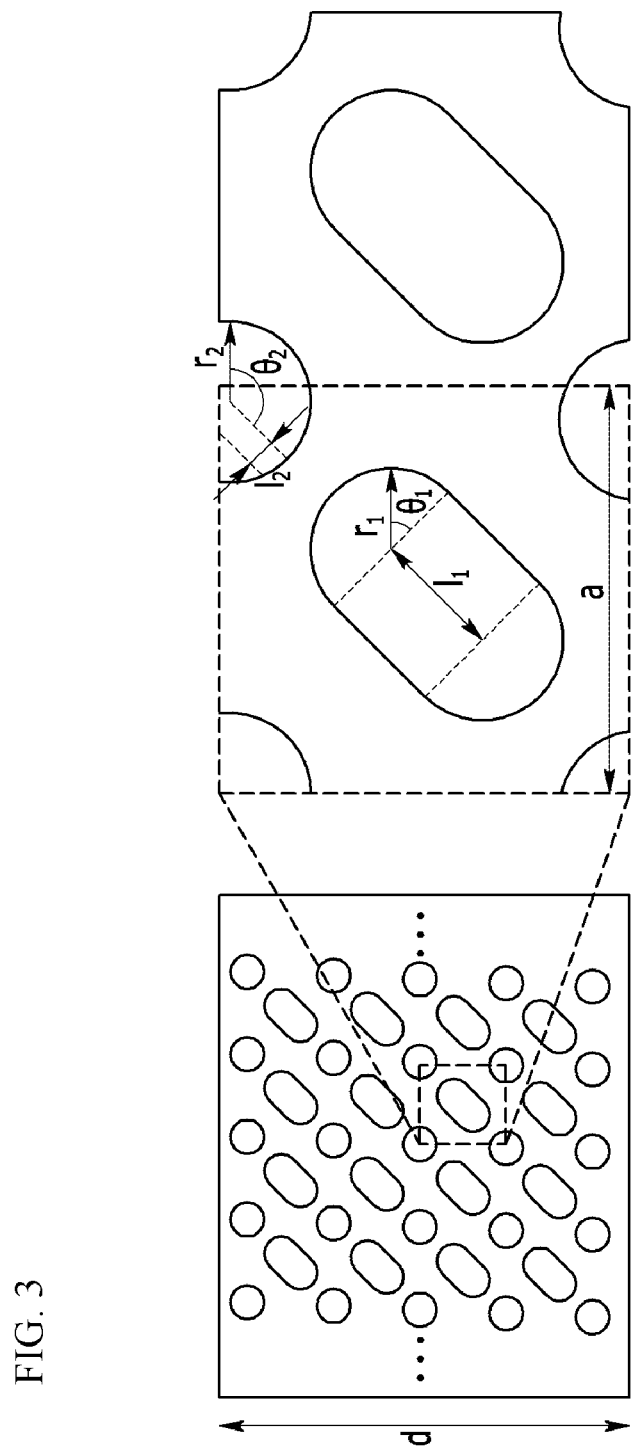
FIG. 3 shows a slit structure of an elastic metamaterial so as to realize an anisotropic medium proposed according to an exemplary embodiment of the present invention.

FIG. 3 shows an elastic metamaterial having a slit structure configured with a rectangle and two semicircles. Design variables of the slit structure include: a length ($l_1$), a radius ($r_1$), and a rotation angle ($\theta_1$) of the first slit positioned in a center of a unit cell; a length ($l_2$), a radius ($r_2$), a rotation angle ($\theta_2$) of the second slit positioned on a vertex of the unit cell; a size (a) of the unit cell; and a number ($N_{cell}$) of the unit cells. When a total of eight design variables of the slit structure are appropriately controlled, the anisotropic medium for fully transmitting an obliquely incident elastic wave having a property that satisfies Equation 1 and Equation 2 may be designed. Regarding the slit structure shown in FIG. 3, the unit cell has an asymmetrical structure may be further efficient to realize extreme anisotropy of the medium.

Figure 4:
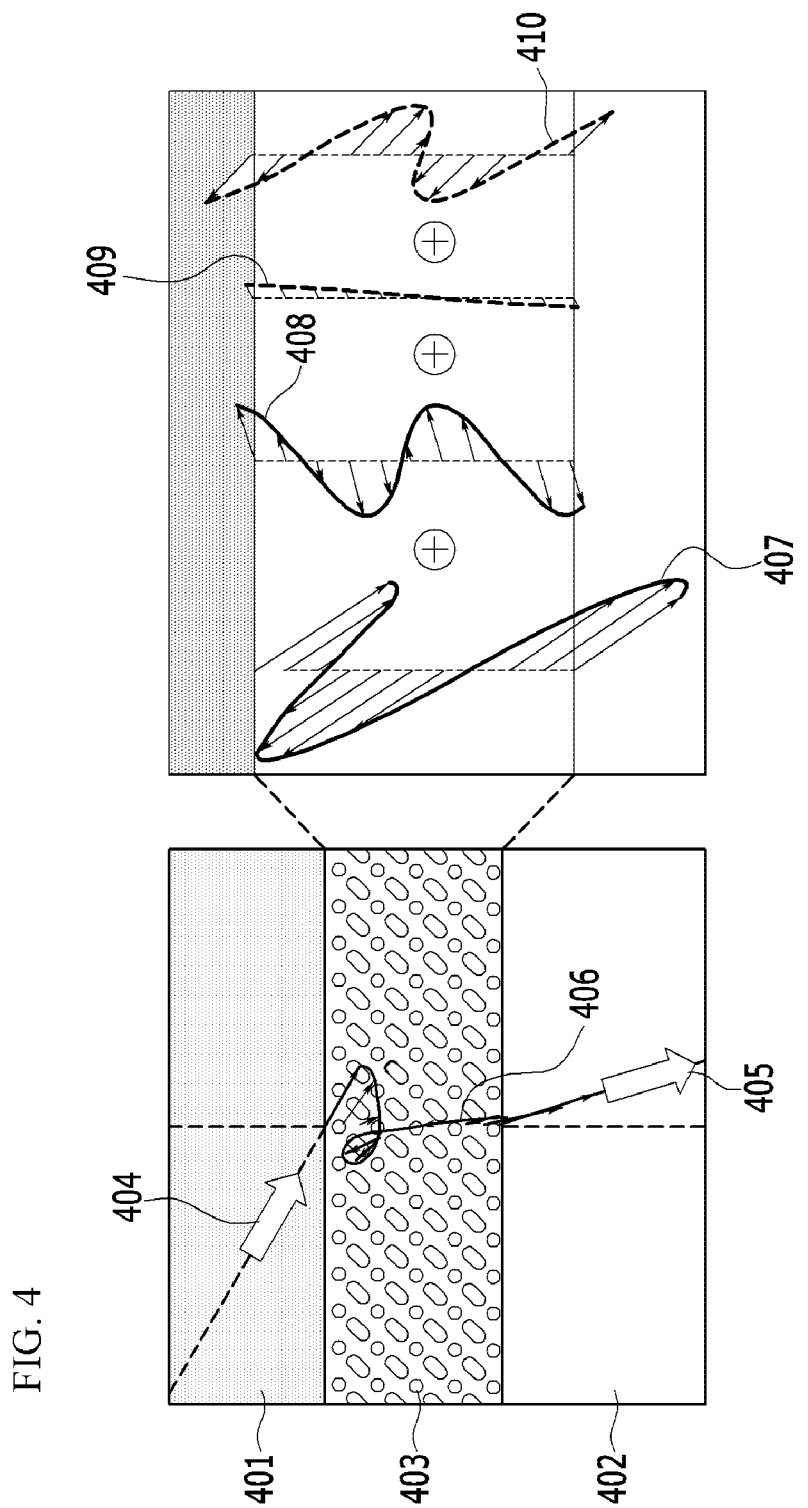
FIG. 4 shows an operational principle of an anisotropic medium for full transmission of an obliquely incident elastic wave.

FIG. 4 shows a principle of an anisotropic medium for fully transmitting an obliquely incident elastic wave according to an exemplary embodiment of the present invention. Referring to FIG. 4, when the property of an anisotropic medium 403 inserted between an incident medium 401 and a transmission medium 402 is designed to satisfy Equation 1 and Equation 2, an incident elastic wave 404 may be fully transmitted as transmitting elastic waves 405 in a desired mode. In this instance, intriguing wave transformation 406 occurs in the anisotropic medium 403. The wave transformation 406 in the anisotropic medium 403 is a total displacement field in the anisotropic medium 403 appearing by interference of four eigenmodes 407, 408, 409, and 410 existing in the anisotropic medium 403. Reference numeral 407 represents a displacement field of the eigenmode 1, and reference numeral 408 represents a displacement field of the eigenmode 2. Reference numeral 409 represents a displacement field of the eigenmode 3, and the reference numeral 410 represents a displacement field of the eigenmode 4. For example, it is assumed that aluminum ($\rho$=2700 kg/m$^3$, E=70 GPa, and v=0.33) is an incident medium and PEEK ($\rho$=1320 kg/m$^3$, E=4.2292 GPa, and v=0.3992) is a transmission medium 402. Here, in the case in which a longitudinal wave of about 90 kHz is incident with an incidence angle of about 60 degrees, the longitudinal wave may be fully transmitted (transmittance=100%) when the property of the anisotropic medium 403 is given that $\rho$=1669.2 kg/m$^3$, $C_{11}$=24.191 GPa, $C_{22}$=43.202 GPa, $C_{66}$=12.364 GPa, $C_{12}$=5.019 GPa, $C_{16}$=−3.276 GPa, and $C_{26}$=−7.732 GPa, and the thickness is 0.05 m, and the shear wave may be fully transmitted (transmittance=100%) when the property of the anisotropic medium 403 is given that $\rho$=2610 kg/m$^3$, $C_{11}$=72.699 GPa, $C_{22}$=95.991 GPa, $C_{66}$=9.9562 GPa, $C_{12}$=−7.84 GPa, $C_{16}$=10.333 GPa, and $C_{26}$=3.2985 GPa, and a thickness is 0.05 m. On the contrary, transmittance of the longitudinal wave is about 39.4% and transmittance of the shear wave is about 20.2% when there is no anisotropic medium 403. Therefore, it is found that transmittance of the longitudinal wave and the shear wave is amplified by about 254% and about 495%, respectively, when the anisotropic medium for fully transmitting an obliquely incident elastic wave is used. In addition to the exemplified property, the full transmission of an obliquely incident elastic wave may be realized by using the anisotropic medium 403 having an appropriate property satisfying Equation 1 and Equation 2.

Figure 5A:
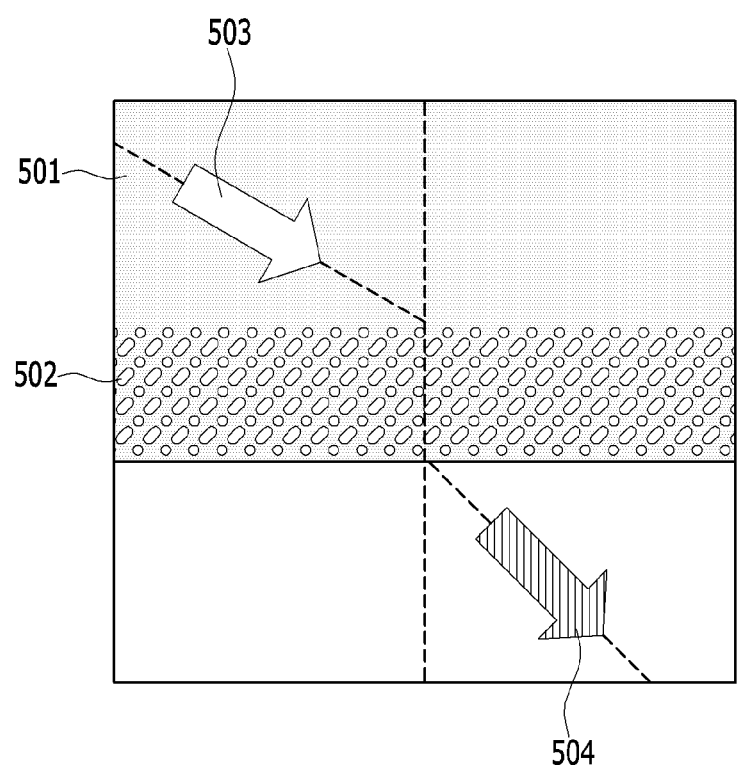
FIG. 5A shows a situation in which a slit structure is designed and manufactured based on an incident medium to fully transmit an incident elastic wave as a transmitting elastic wave in a desired mode.
Figure 5B:
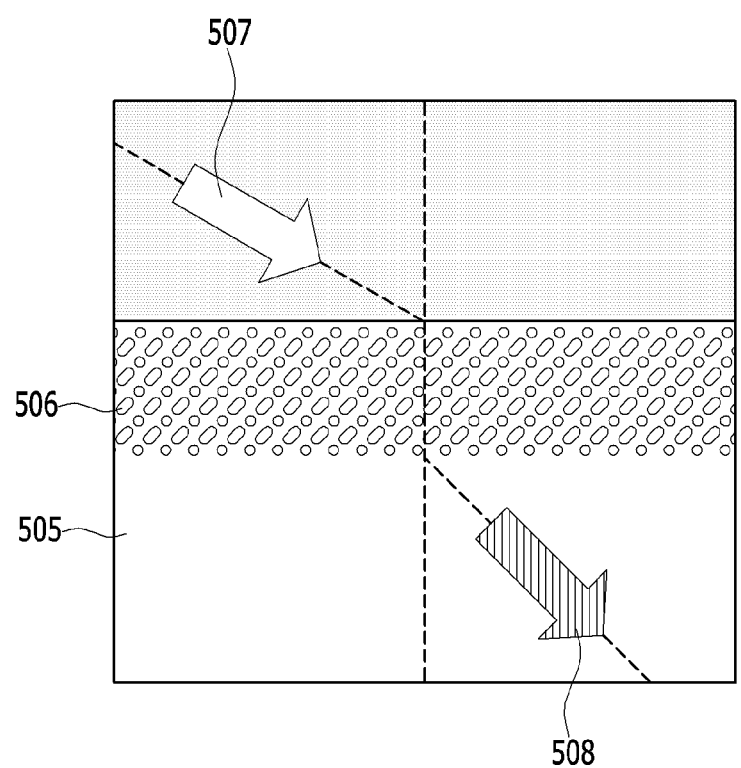
FIG. 5B shows a situation in which a slit structure is designed and manufactured based on a transmission medium to fully transmit an incident elastic wave as a transmitting elastic wave in a desired mode.

The slit structure of the elastic metamaterial may be manufactured based on the incident or transmission medium as a substrate, which is shown in FIG. 5A and FIG. 5B. It may be determined which medium to be used as a substrate by considering a manufacturing possibility, a cost, a time, etc., overall.

FIG. 5A shows a situation in which a slit structure 502 is manufactured based on an incident medium 501, and an incident elastic wave 503 is fully transmitted as a transmitting elastic wave 504. FIG. 5B shows a situation in which a slit structure 506 is manufactured based on a transmission medium 505 to fully transmit an incident elastic wave 507 to a transmitting elastic wave 508.

Figure 6A:
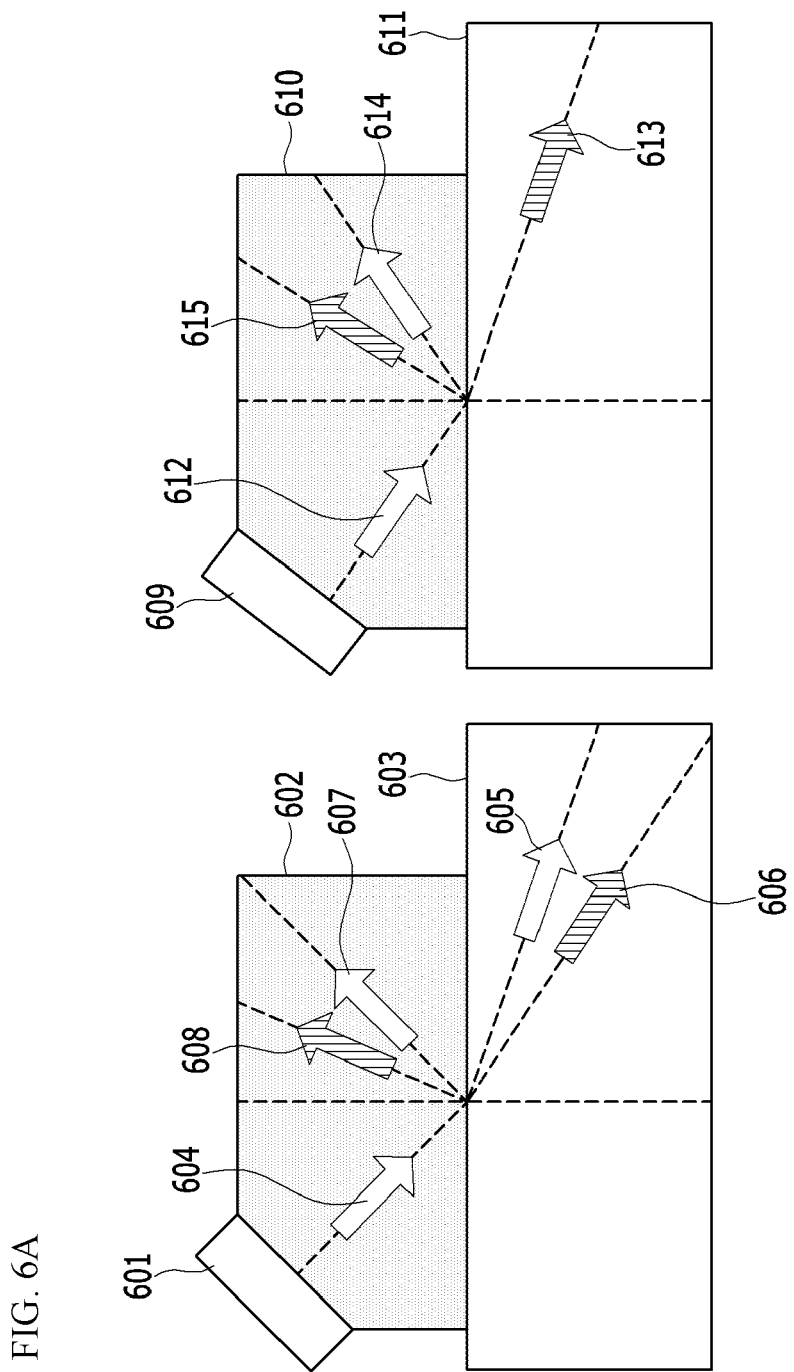
FIG. 6A shows an operational principle of a transducer according to a comparative example.

According to an exemplary embodiment of the present invention, the anisotropic medium for fully transmitting an obliquely incident elastic wave may be used to increase performance of a transducer system for generating and sensing an elastic wave. A conventional elastic wave transducer system is shown in FIG. 6A, and an elastic wave transducer system according to an exemplary embodiment of the present invention is shown in FIG. 6B. Efficiency of the system may be increased by removing the reflecting elastic wave and the transmitting elastic wave in an undesired mode necessarily generated by the conventional system by use of the anisotropic medium for fully transmitting an obliquely incident elastic wave.

FIG. 6A shows an operational principle of a conventional transducer. A case in which a longitudinal wave is obliquely incident to the specimen 603 by using a transducer 601 and a wedge 602 will now be described. When an incident elastic wave 604 is incident to the boundary of a wedge 602 and a specimen 603, there are a transmitting shear wave 606, a reflecting longitudinal wave 607, and a reflecting shear wave 608, in addition to a transmitting longitudinal wave 605. A case in which a shear wave is obliquely transmitted to a specimen 611 by using a transducer 609 and a wedge 610 will now be described. When an incident elastic wave 612 is incident with an angle that is equal to or greater than a Snell's critical angle, a transmitting shear wave 613 is purely transmitted, but there are a reflecting longitudinal wave 614 and a reflecting shear wave 615. Resultantly, the energy efficiency of the conventional transducer is low because of the reflecting elastic wave that is necessarily generated.

FIG. 6B shows an operational principle of a transducer to which an anisotropic medium for fully transmitting an obliquely incident elastic wave according to an exemplary embodiment of the present invention is applied. A case for obliquely transmitting a longitudinal wave will now be described with reference to a drawing on the left of FIG. 6B. The system is configured with a conventional transducer 616, a wedge 617, and an anisotropic medium 619 inserted between the wedge 617 and a specimen 618. The anisotropic medium 619 fully and purely transmits a transmitting longitudinal wave 621. A case for obliquely transmitting a shear wave will now be described with reference to a drawing on the right of FIG. 6B. In a like manner, the system is configured with a conventional transducer 622, a wedge 623, and an anisotropic medium 625 inserted between the wedge 623 and a specimen 624. The anisotropic medium 625 fully and purely transmits a transmitting shear wave 627. As there is no reflecting elastic wave, it has better efficiency than the conventional transducer.

Figure 7A:
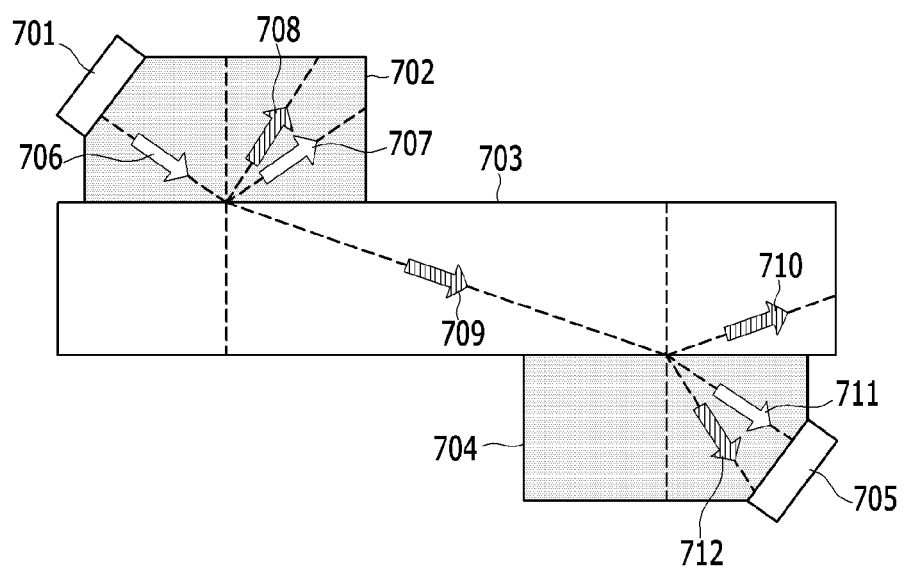
FIG. 7A shows an operational principle of a wedge-based pipe test according to a comparative example.

The anisotropic medium for fully transmitting an obliquely incident elastic wave may be used for a wedge-based pipe. A case of using a conventional wedge is shown in FIG. 7A, and a case of using a metawedge using full transmission of an obliquely incident elastic wave is shown in FIG. 7B. When the anisotropic medium for fully transmitting an obliquely incident elastic wave is used, the elastic wave in a desired mode may be transmitted through the pipe with efficiency of 100%, thereby having a merit of outperforming the conventional art.

FIG. 7A shows an operational principle of a conventional wedge-based pipe test. A system includes a transmitting transducer 701, a transmitting wedge 702, a pipe 703, a receiving wedge 704, and a receiving transducer 705. When an incident elastic wave 706 with an angle that is equal to or greater than the Snell's critical angle is incident to the boundary of the transmitting wedge 702 and the pipe 703, some elastic waves are reflected (which are a reflecting longitudinal wave 707 and a reflecting shear wave 708), and a transmitting shear wave 709 is purely transmitted to the pipe 703. When a shear wave is incident to the boundary of the pipe 703 and the receiving wedge 704, some shear waves are reflected, and some elastic waves (which are a transmitting longitudinal wave 711 and a transmitting shear wave 712) are transmitted to the receiving wedge 704. There are undesired reflecting elastic waves and the transmitting elastic waves in an undesired mode, so the efficiency of the system is low.

FIG. 7B shows an operational principle of a metawedge-based pipe test according to an exemplary embodiment of the present invention. The system includes a transmitting transducer 713, a transmitting wedge 714, a transmitting anisotropic medium 715, a pipe 716, a receiving anisotropic medium 717, a receiving wedge 718, and a receiving transducer 719. The transmitting anisotropic medium 715 fully transmits an incident elastic wave 720 to the pipe 716 as a transmitting shear wave 721. The receiving anisotropic medium 717 fully transmits the above-noted wave to the receiving wedge 718 as a transmitting longitudinal wave 722. As there is no reflected elastic wave, it has better efficiency than the conventional system.

Figure 8A:
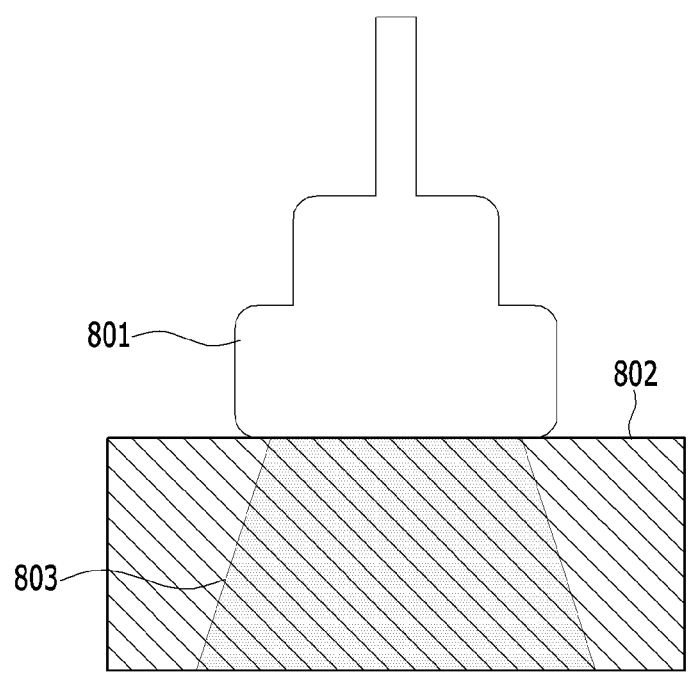
FIG. 8A shows a situation in which an ultrasonic wave generated by a medical ultrasonic device according to a comparative example transmits into a piece of human anatomy.
Figure 8B:
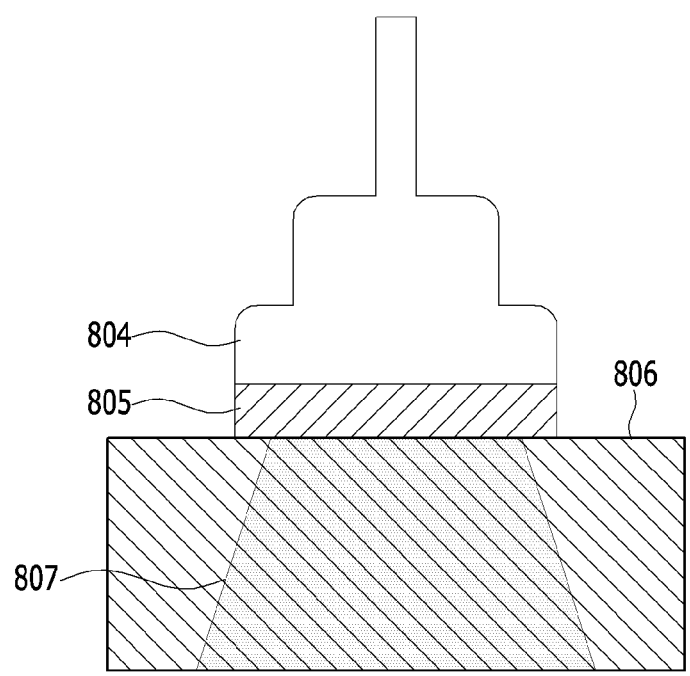
FIG. 8B shows a situation in which an anisotropic medium proposed by an exemplary embodiment of the present invention is inserted into a medical ultrasonic device according to a comparative example and an elastic wave is transmitted into a piece of human anatomy.

According to an exemplary embodiment of the present invention, the anisotropic medium for fully transmitting an obliquely incident elastic wave is usable in medical ultrasonic wave technologies, which is shown in FIG. 8A and FIG. 8B. In prior art, as shown in FIG. 8A, when the ultrasonic waves were transmitted to the piece of human anatomy from the transducer, transmittance was low, and there were many mixed modes, so it was difficult to perform a wave analysis. However, when the anisotropic medium for fully transmitting an obliquely incident elastic wave is used, medical ultrasonic signals may be substantially improved as shown in FIG. 8B.

FIG. 8A shows a situation of a transmitting elastic wave 803 in which an ultrasonic wave generated by a conventional medical ultrasonic device 801 transmits into a piece of human anatomy 802. In this instance, transmittance may be low and many modes may be mixed because of the existence of the reflected elastic waves. FIG. 8B shows a situation of a transmitting elastic waves 807 in which an anisotropic medium 805 for fully transmitting an obliquely incident elastic wave is inserted into a conventional medical ultrasonic device 804 and an elastic wave is transmitted to a piece of human anatomy 806. In this instance, the elastic wave in a desired mode is 100% transmitted, so it is advantageous in the analysis of ultrasonic wave signals.

Figure 9:
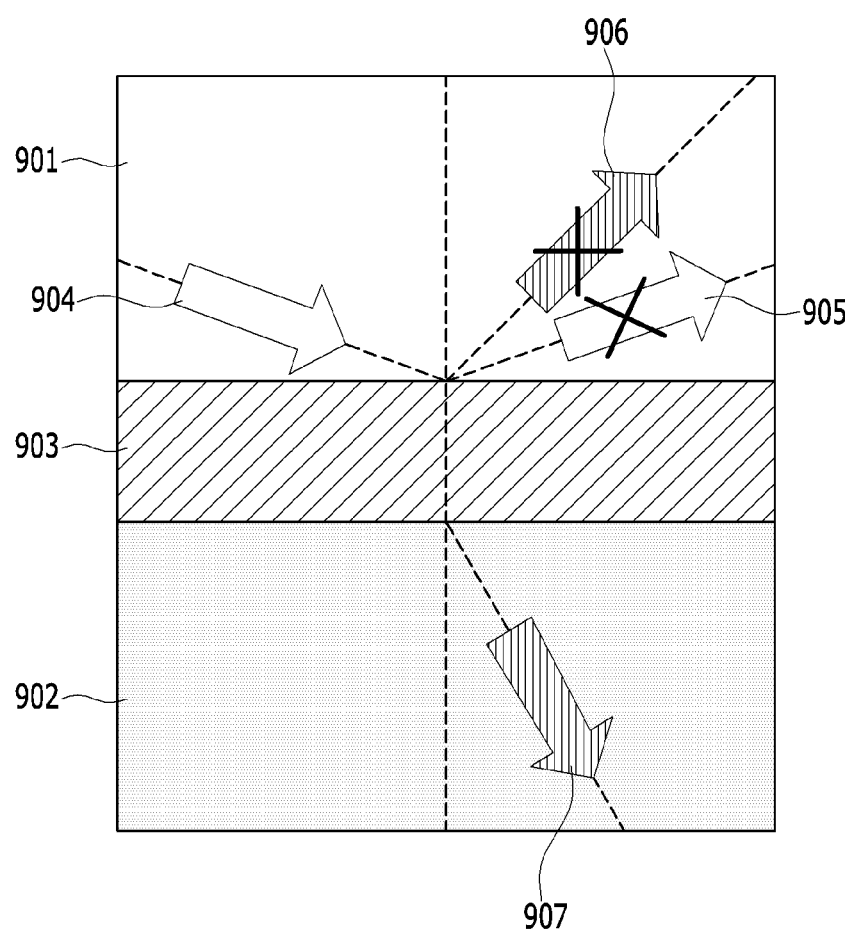
FIG. 9 shows an antireflection film or a full absorption film having no reflecting elastic wave therein when an incident elastic wave is incident by inserting an anisotropic medium into a boundary of two different media.

The antireflection film or the full absorption film may be realized by inserting the anisotropic medium for fully transmitting an obliquely incident elastic wave between two different media, which is shown in FIG. 9.

FIG. 9 shows that an anisotropic medium 903 is inserted between two different media (an incident medium 901 and a transmission medium 902), and hence, when an incident elastic wave 904 is incident, there exists no reflecting elastic wave (a longitudinal wave 905 or a shear wave 906). Here, the anisotropic medium 903 may operate as an antireflection film or a full absorption film. Energy of the incident elastic wave 904 is fully transmitted to a transmitting elastic wave 907.

A signal analysis of the obliquely incident elastic waves may be applied to fields such as a nondestructive testing for a structural health monitoring, defect inspection, a wedge-based pipe test, a wedge-based non-invasive flowmeter, a medical ultrasonic treatment skill, a medical ultrasonic imaging skill, and an ultrasonic transducer. The anisotropic medium for fully transmitting an obliquely incident elastic wave according to an exemplary embodiment of the present invention may be applied to the above-noted fields and may improve intensity and quality of the transmitting elastic wave signal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An anisotropic medium for fully transmitting an obliquely incident elastic wave, comprising:
    an incident medium to which an incident elastic wave including a longitudinal wave and a shear wave, and being obliquely incident with a predetermined incidence angle, is incident and reflected;
    a transmission medium to which a transmitting elastic wave including a longitudinal wave and a shear wave is transmitted; and
    an anisotropic medium, installed between the incident medium and the transmission medium, for blocking reflection of a predetermined reflecting elastic wave as a predetermined full transmission condition is satisfied, and fully transmitting a transmitting elastic wave in a predetermined type of full transmission,
    wherein the full transmission condition includes
    a phase matching condition based on a wavenumber relationship of an eigenmode in the anisotropic medium, and
    a polarization matching condition based on a relationship between a polarization vector and an amplitude of the eigenmode.

2. The anisotropic medium of claim 1, wherein the phase matching condition satisfies Equation 1:

$$(k_1-k_2) \times d = l\pi$$
$$(k_1-k_3) \times d = m\pi$$
$$(k_1-k_4) \times d = n\pi \quad \text{[Equation 1]}$$

($k_i$: a wave number of the eigenmode i (i=1, 2, 3, and 4), d: a thickness of the anisotropic medium, and l, m, and n: integers).

3. The anisotropic medium of claim 1, wherein the polarization matching condition satisfies Equation 2:

Equation 2

In the case of longitudinal wave→longitudinal wave full transmission, $$\left\{ \begin{array}{c} \cos\theta_L^{inc} \\ \sin\theta_L^{inc} \end{array} \right\} = \sum_{i=1}^{4} A_i \vec{P}_i, \quad \tan\theta_L^{tra} = \frac{\sum_{i=1}^{4} A_i \cos(k_i d) P_y^i}{\sum_{i=1}^{4} A_i \cos(k_i d) P_x^i}$$

In the case of shear wave→shear wave full transmission, $$\left\{ \begin{array}{c} \cos\theta_L^{inc} \\ \sin\theta_L^{inc} \end{array} \right\} = \sum_{i=1}^{4} A_i \vec{P}_i, \quad \tan\theta_L^{tra} = \frac{\sum_{i=1}^{4} A_i \cos(k_i d) P_y^i}{\sum_{i=1}^{4} A_i \cos(k_i d) P_x^i}$$

In the case of longitudinal wave→shear wave full transmission, $$\left\{ \begin{array}{c} \cos\theta_L^{inc} \\ \sin\theta_L^{inc} \end{array} \right\} = \sum_{i=1}^{4} A_i \vec{P}_i, \quad \tan\theta_L^{tra} = \frac{\sum_{i=1}^{4} A_i \cos(k_i d) P_y^i}{\sum_{i=1}^{4} A_i \cos(k_i d) P_x^i}$$

In the case of shear wave→longitudinal wave full transmission, $$\begin{Bmatrix} -\sin\theta_S^{inc} \\ \cos\theta_S^{inc} \end{Bmatrix} = \sum_{i=1}^{4} A_i \vec{P}_i, \quad -\cot\theta_S^{tra} = \frac{\sum_{i=1}^{4} A_i \cos(k_i d) P_y^i}{\sum_{i=1}^{4} A_i \cos(k_i d) P_x^i} \quad (5)$$

($\theta_L^{inc}$: an incidence angle of an incident longitudinal wave, $\theta_S^{inc}$: an incidence angle of an incident shear wave, $\theta_L^{tra}$: a refraction angle of a transmitting longitudinal wave, $\theta_S^{tra}$: a refraction angle of a transmitting shear wave, $k_i$: a wavenumber of an eigenmode i, $\vec{P}_i = (P_x^i, P_y^i)$: a polarization vector of an eigenmode i, and $A_i$: and a displacement amplitude of an eigenmode i (i=1, 2, 3, and 4)).

4. The anisotropic medium of claim 1, wherein the incident medium and the transmission medium include different media.

5. The anisotropic medium of claim 3, wherein the anisotropic medium mutually contacts a boundary surface of the incident medium and a boundary surface of the transmission medium between the incident medium and the transmission medium as a surface contact, respectively.

6. The anisotropic medium of claim 1, wherein the type of full transmission includes a mode-preserving full transmission in which the incident elastic wave and the transmitting elastic wave have an identical mode, and a mode-converting full transmission in which modes of the incident elastic wave and the transmitting elastic wave are converted.

7. The anisotropic medium of claim 1, wherein the anisotropic medium includes an elastic metamaterial including a predetermined slit structure.

8. The anisotropic medium of claim 7, wherein, regarding the elastic metamaterial, a slit structure of a unit cell is periodically arranged from top to bottom and from right to left.

9. The anisotropic medium of claim 8, wherein the slit structure has a slit shape including a rectangle and two semicircles.

10. The anisotropic medium of claim 9, wherein the slit structure includes predetermined design variables, and the design variables include a length ($l_1$), a radius ($r_1$), and a rotation angle ($\theta_1$) of the first slit positioned in a center of a unit cell; a length ($l_2$), a radius ($r_2$), and a rotation angle ($\theta_2$) of the second slit positioned on a vertex of the unit cell; a size (a) of the unit cell; and a number ($N_{cell}$) of the unit cells.

* * * * *